July 23, 1946.  H. S. HOFFAR  2,404,378
ANTIFRICTION WORM DRIVE
Filed Aug. 1, 1944  2 Sheets-Sheet 1

INVENTOR.
Henry S. Hoffar
BY Reynolds & Beach
ATTORNEYS

Patented July 23, 1946

2,404,378

UNITED STATES PATENT OFFICE

2,404,378

ANTIFRICTION WORM DRIVE

Henry S. Hoffar, Vancouver, British Columbia, Canada, assignor to The Cleveland Pneumatic Tool Company, Cleveland, Ohio, a corporation of Ohio Application August 1, 1944, Serial No. 547,579

16 Claims. (Cl. 74—458)

1

This invention pertains to antifriction worm drive mechanism, particularly that type which is adapted for incorporation in automotive steering gears.

It has been proposed heretofore, in an antifriction worm drive, to utilize a cylindrical worm about which bearing balls circulate, and which balls engage complemental grooves of a gear sector. Such antifriction worm and gear mechanism is shown, for example, in Figures 7 and 8 of my patent application Serial No. 517,927, filed Jan. 12, 1944. In that instance the balls in only a single row engage the worm gear or sector at any given time.

It has further been proposed, as illustrated in Figures 11 and 12 of my aforesaid patent application, for example, to utilize in such a combination a worm having a central portion of smaller size than its end portions, so that the concavity of its periphery in an axial plane would correspond to the peripheral convexity of the worm gear or sector in a plane perpendicular to its axis. In such an arrangement at least two, and at times perhaps three, rows of balls would be interengaged between the worm and gear.

The principal advantage of using an antifriction worm and gear combination is the increased efficiency of the drive resulting from the reduction in friction. Minimum drag can only be obtained if all sliding friction between the worm and gear or gear sector is eliminated, and only rolling friction is present. In a concave type of worm, therefore, such as disclosed in Figures 11 and 12 of my aforesaid application, maximum efficiency is not obtained because sliding friction is not completely eliminated.

Although the balls midway between the ends of such a concave worm, which are closest to its axis of rotation, must move along the worm groove at the same speed as the balls nearer one end of the worm, and hence farther from its axis of rotation, the peripheral velocity of the worm portion engaging balls farther from the worm's rotative axis is greater than that of the portion closer to the rotative axis engaging the balls centrally of the worm. Consequently the worm groove portions near each end must slide on the balls engaged with a gear groove or rotate them faster, while the balls centrally of the worm in contact with the gear will slide on the worm groove or rotate more slowly than the outer balls. Sliding friction will therefore occur between the central or the outer balls and the worm groove, or between the central and outer balls rotating at different speeds, or more than one of these conditions will be present each to a lesser degree. The resultant effect, however, is virtually the same amount of sliding friction between the parts. Such friction also tends to crowd together the balls moving toward the worm center and to spread apart the balls moving away from the worm center, which also increases the friction.

When a cylindrical worm, as shown in Figure 8 of my prior application, is used, only a single row of balls is in contact between the worm and worm wheel at any given instant, so that the unequal and antagonistic movement of balls engaging different gear grooves, as described above, does not occur. In this instance, however, since the periphery of the worm is not exactly complemental to the periphery of the worm wheel, the interengaged balls are in closest contact with the grooves of such members when disposed in that axial plane of the worm gear or gear sector which is perpendicular to the rotative axis of the worm. When the balls interengaged between the worm and worm gear are spaced appreciably from either side of this plane they do not fit closely in the groove of either element, because the bottoms of such grooves are spaced farther apart than are the bottoms of such grooves in such axial plane of the gear. Consequently the play or backlash between the worm and gear becomes progressively greater as the load carrying balls move farther away from such plane.

It is therefore the principal object of my present invention to provide a worm and gear arrangement in which only a single row of load transmitting balls is interengaged between such members at any given time, so that no sliding friction will be created either between any balls and the worm grooves, or between different balls because of their rotation at different speeds, nor will any resistance to movement of balls toward the worm center occur. Since there will be several balls in such single row interengaged between the worm and worm gear members it is necessary, in order to eliminate all sliding friction between these balls, to provide alternate spacer balls separating the load carrying balls in the manner disclosed in my Patent No. 2,298,011, issued Oct. 6, 1942. It is preferred, however, that the relationship between the diameter of the balls and the thickness of the worm gear be such that at least two load carrying balls will be engaged with a single groove of the worm at all times.

Another object of my invention is to maintain a close fit of the load carrying balls with both the worm groove and the worm wheel groove regardless of the position of such balls axially of the worm relative to the axial plane of the worm wheel perpendicular to the worm's axis. Such object is accomplished by forming the worm groove so that the distance between its bottom and the rotative axis of the worm increases progressively from such worm wheel plane centrally of the worm in each direction through a worm convolution of 180 degrees, and thereafter such distance does not increase at a rate sufficient to maintain a close fit of the balls in the worm and worm wheel grooves, and preferably actually decreases.

More specifically it is an object of my invention to incorporate such worm and gear mechanism in an automotive steering gear, for which application it is important that there be no backlash between the steering column, on which the worm is mounted, and that portion of the steering apparatus to which the worm gear sector or quadrant is connected. Otherwise undesired looseness of the wheel mounting may occur. At the same time it is desirable that the efficiency of such mechanism be as high as possible to reduce the turning effort which must be exerted by the driver on the steering wheel, especially in installations for large trucks and busses.

To utilize my novel worm and gear mechanism most effectively it is a further object to enable the relationship of the worm and worm gear sector to be adjusted relatively within close limits, so that the proper clearance between the bottoms of the worm and gear sector grooves may be established, and maintained even though the parts may become worn to a greater or lesser degree.

In fact, to insure that no play will occur between the bearing balls and either member engaged thereby, it is an object of my invention to grip the balls between such members by resilient pressure thereof toward each other, when desired. The degree of such resilient pressure may be regulated as required.

Additional features of my invention, and more particularly of my preferred structure intended for use in automotive steering gears, will be mentioned in the following detailed description of the embodiment illustrated in the accompanying drawings. Various changes may, of course, be made in the construction within the scope of my invention as defined in the appended claims, and it may be incorporated in worm and gear mechanisms for other uses than in steering gears.

The problem of maintaining a close fit of balls in the grooves of a worm and worm gear is much more pronounced where the worm gear is relatively small, its radius being not appreciably greater than that of the worm, and perhaps even being less, as in the automotive steering gear assembly illustrated. The reason for this is that the gear travels through such a large angle each time the worm makes a complete revolution. In the typical instance selected the gear moves 20 degrees for each revolution of the worm. The pitch of a worm helix is slight, and consequently the distance between all portions of any given worm gear groove and the axis of the worm is nearly uniform if the worm gear periphery has the proper concavity axially to embrace the worm, as is customary. The average spacing between the worm's axis and the bottom of a worm gear groove through which that axial plane of the worm gear perpendicular to the worm's rotative axis passes, and the average spacing between the worm's axis and the bottom of a gear groove spaced 10 degrees from such groove, however, are appreciably different. While all the balls in any single groove, which are of the same size, will bear substantially equally against both the worm and gear, therefore, whether the worm is of the cylindrical type or is concave axially, the balls in gear grooves spaced apart a substantial angle, for example 10 degrees, will not bear similarly in the worm and gear grooves if the worm is cylindrical.

Figure 1:
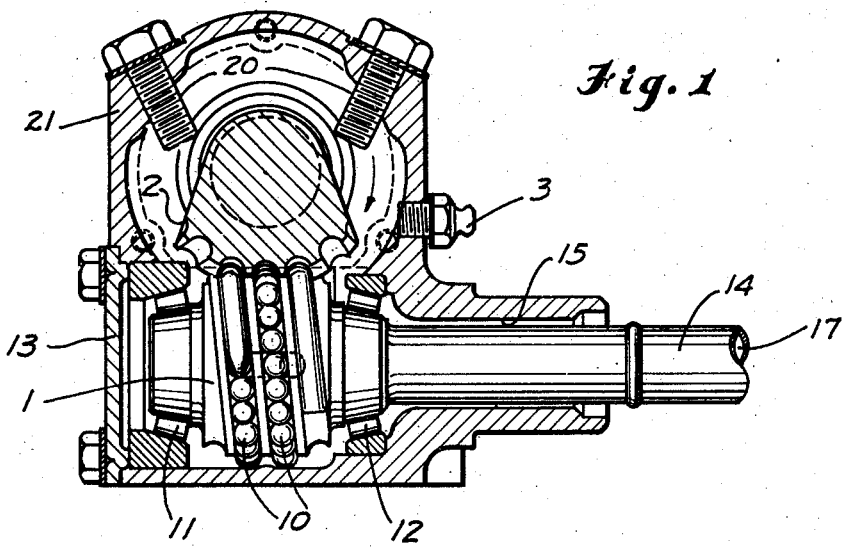
Figure 1 is a sectional view through an automotive steering gear assembly in which the worm is in elevation.
Figure 2:
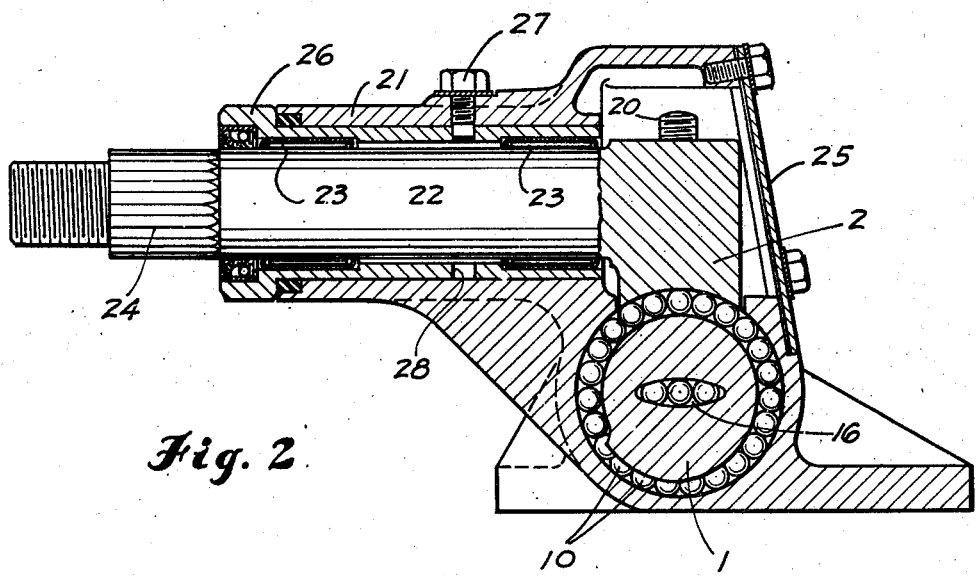
Figure 2 is a sectional view through the same mechanism taken perpendicularly to the section of Figure 1 and showing in elevation the shaft carrying the worm gear.

Figures 1 and 2 illustrate the worm 1 and the worm gear sector 2 in a relationship in which the gear groove is intersected by an axial plane of the gear perpendicular to the worm's axis. In this particular instance the gear sector groove thus located happens to be its central groove, but it is immaterial which one of its grooves is thus disposed as far as the engagement of balls 10 is concerned. With the worm and gear in this particular relationship they may be spaced so that the load carrying balls bear properly and without appreciable backlash in the grooves of both elements regardless of the contour of the worm. My invention enables such engagement in the grooves of both the gear and worm to be preserved in all rotative positions of the worm.

It will be understood, of course, that when alternate large and small balls are employed, as taught in my aforementioned Patent No. 2,298,011, which is preferred, only the larger or load carrying balls will be thus engaged. As shown in Figure 2, however, the ball size and worm gear width should be related so that at least two of such larger balls will always contact the worm gear groove, to provide proper distribution of the load.

As the worm 1 is rotated about its axis the worm gear sector 2 will be rotated through a comparatively small angle. In the present instance the pitch of the worm and the radius of the worm gear sector have been selected so that rotation of the worm through an angle of 18 degrees swings the sector through an angle of 1 degree. Hence for each complete revolution of the worm the gear sector 2 will be swung through an angle of 20 degrees as mentioned.

If the root diameter of the worm were uniform throughout its length, following conventional practice, the spacing between the bottoms of a given gear sector groove and of the adjacent portion of the worm groove would increase as the gear sector rotated in either direction from the centered position of one of its ball engaging grooves shown in Figure 1, in which such groove intersects or substantially coincides with the axial plane of the gear sector which is perpendicular to the axis of worm 1.

As the worm continued to rotate for swinging the sector in the direction indicated by the arrow in Figure 1, for example, this distance would increase until the worm had rotated through substantially 180 degrees. At that time the load would be transferred from the balls at the left in Figure 1 to the balls at the right, so that the forces between the parts previously transmitted through the central groove of the gear sector would then be transmitted through the groove next on the right of such central groove. The bottom of this groove, as rotation of the parts in the same direction continued, would approach the worm axis until such groove reached the position of the central worm groove shown in Fig. 1.

The spacing between the bottoms of the worm and gear grooves would not change greatly during swinging of a gear sector groove through 10 degrees either side of its central position, but the variation would be sufficient to permit play in the parts, even though there was no play when the worm gear groove was centered relative to the worm. To eliminate this play as the worm and gear sector rotate conjointly, the contour of the worm groove bottom may be shaped so that the spacing between the bottom of the ball receiving gear sector groove and the bottom of the worm groove portion adjacent thereto will remain constant during rotation of the gear through an angle of 20 degrees, corresponding to a complete revolution of the worm, provided that such gear angle is substantially bisected by the axial plane of the gear perpendicular to the worm axis.

This result is accomplished by forming the worm groove of decreasing depth, or increasing the spacing between the bottom of the worm groove and the worm's axis, each side of the central portion of the worm, namely, that portion which is intersected by the axial plane of the gear sector perpendicular to the worm's axis. The rate at which the groove depth decreases or groove bottom spacing increases is not uniform, but on the contrary, such spacing is found to increase almost exactly in proportion to the square of the gear segment's angle of rotation for small angles.

For any given angle of worm gear movement the bottom of one of its grooves in the central position of closest approach to the worm recedes from the worm's axis a distance equal to the difference between the root radius of the gear sector and such radius multiplied by the cosine of such given angle through which the gear sector is rotated. To find the root radius of the worm at any point this relationship may be written mathematically as follows:

$$Y-K=R-R\cos a=R(1-\cos a)$$

where

Y is the root radius of the worm,
K is the minimum root radius of the worm located in the axial plane of the worm gear perpendicular to the worm's axis,
R is the root radius of the worm gear, and
$a$ is the angle of rotation of the worm gear.

Since for small changes in angle $a$ the change in the factor $(1-\cos a)$ is found to be proportional to $a^2$, $$(1-\cos a)=Ca^2$$

where C is a constant. For $a=1$ degree, $$(1-\cos 1°)=C$$

so that for other degrees $$(1-\cos a)=(1-\cos 1°)a^2$$

Therefore, substituting in the above equation, $$Y-K=R(1-\cos 1°)a^2$$

Proof that the quantity $(1-\cos a)$ varies in proportion to $a^2$ may be afforded by comparing calculations of $(1-\cos a)$ and $(1-\cos 1°)a^2$ for angles of worm gear change from 1 degree to 10 degrees. These comparative values are listed in the following table.

| Worm gear sector degrees | $(1-\cos a)$ | $(1-\cos 1°)a^2$ |
|---|---|---|
| 1 | 0.0001523 | 0.0001523 |
| 2 | .00061 | .00061 |
| 3 | .00137 | .00137 |
| 4 | .00244 | .00244 |
| 5 | .00381 | .00381 |
| 6 | .00548 | .00548 |
| 7 | .00745 | .00746 |
| 8 | .00973 | .00975 |
| 9 | .01231 | .01234 |
| 10 | .01519 | .01523 |

Since $$Y-K=R(1-\cos 1°)a^2$$

$$a^2=\frac{Y-K}{R(1-\cos 1°)}=\frac{Y-K}{R(1-.9998477)}=$$

$$\frac{Y-K}{R(.0001523)}=\frac{6566}{R}(Y-K)$$

This equation is the same form as the equation for a parabola related to rectangular coordinates as follows:

$$X^2=4f(Y-K)$$

Where X and Y are the coordinate values, $f$ is the distance between the focus and the apex, which is constant for any selected parabola, and K is the offset of the apex from the X axis.

It will be seen by comparing the values of $(1-\cos a)$ with those of $(1-\cos 10°)a^2$ in the above table that for any angular departure from central position of a worm gear groove up to about 7 degrees, the difference between the values $Y-K$ using $(1-\cos a)$ and the equation for a curve of true parabolic shape of developed worm root curve is less than .00001 R. Hence where the worm gear pitch radius is 1 inch the worm root would conform to true parabolic shape within one one hundred thousandth of an inch for an angular worm gear movement of 7 degrees. Even for an angular gear movement of 10 degrees the difference in such calculations is only about .00004 of an inch, which is negligible. Consequently we may assume that if the developed curve of the worm groove bottom is of parabolic shape, for small angles of worm gear movement the spacing between the bottoms of the worm gear groove and the adjacent portion of the worm groove will remain constant.

If, on the other hand, the bottom of the worm groove, when developed, were merely a straight line, as in a conventional cylindrical worm, instead of a parabolic curve, the worm gear groove bottom would have receded from the bottom of the worm groove a distance of .01523 of an inch, or approximately 1/64 of an inch, if the root diameter of the worm were one inch, during a 10 degree angular movement of the worm gear groove from its central location of closest approach to the worm axis. This variation would allow appreciable backlash in the mechanism, which my invention eliminates.

Figure 6:
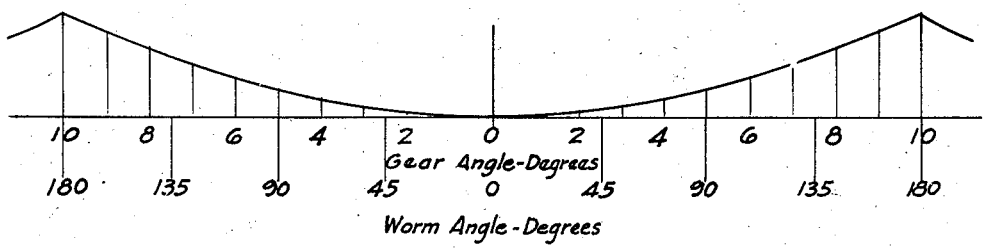
Figure 6 is a graph illustrating, on a greatly enlarged scale, the developed contour of the worm groove with relation to the worm's rotative axis measured in degrees of worm and worm gear rotation.

In Figure 6 of the drawings the developed contour of the parabolic worm groove bottom is shown on a greatly exaggerated scale. In determining this developed shape of the worm groove bottom either one of the following equations may be used at the will of the designer:

(1) $$Y = K + R(1 - \cos a)$$

or (2) $$Y = K + (1 - \cos 1°)Ra^2 = K + .0001523 Ra^2$$

In applying either of these formulas it will be understood that the maximum value of the gear sector angle $a$ will be that through which such gear sector is moved by one-half a revolution of the worm. This is necessary so that only one worm gear groove will be engaged by balls at any given time, except perhaps for a brief instant during which balls are being disengaged from one worm gear groove and engaged with an adjacent groove. During such transition, however, the balls in the two gear grooves will engage worm portions of equal radii, so that no resistance to movement of the balls, tending to cause sliding friction, occurs. The maximum value of worm gear angle $a$ will, of course, depend upon the pitch of the worm groove and the worm gear radius.

For angles of worm gear movement $a$ greater than that corresponding to a 180 degree rotation of the worm the value of Y must be less than that which would be obtained by a solution of either of the equations above, so that the balls will be released abruptly from the gear groove moving away from a position centrally of the worm as the balls engage in the adjacent gear groove moving toward said position. Although Y might still continue to increase beyond 180 degrees from the worm center, the rate of increase must be more gradual than that governed by the above equations, but it is preferred that beyond such worm angle the value of Y actually decrease. The further alternative is for Y to remain constant above the worm angle of 180 degrees from center. For convenience the rate of Y decrease may be the same as its previous rate of increase, so that either of the same equations could be used by substituting decreasing angles of $a$ beyond 10 degrees. The sections of the developed worm curve at opposite sides of each 180 degree section thus join to form substantially a ceratoid cusp. This conformation is shown in the curve of Fig. 6, and the worm groove may be ground in this fashion by shifting a grinding wheel toward and away from the worm axis under the control of a cam of proper contour. This worm construction insures that the load will be transmitted between the worm and worm gear elements by balls in only a single worm gear groove at any given time, with the negligible exception of the instant the load is being transferred from the balls in one worm gear groove to the balls in an adjacent groove.

As an example of a typical installation it has been stated that the worm gear 2 may be rotated through 20 degrees for each complete rotation of the worm 1. Stop screws 20 threaded into casing 21, in which the worm gear sector is journaled, limit rotation of the sector to an angle of approximately 40 degrees in each direction from the central position shown, or a total of 80 degrees. It would therefore be necessary to revolve worm 1 through approximately four complete revolutions to swing gear sector 2 from one extreme position to the other, so that two gear sector grooves are provided at each side of its central groove. During one complete revolution of the worm from the position shown in Figure 1 it will return to the identical position, but the balls will engage the worm gear groove adjacent to its center groove, either on the right or on the left depending upon the direction in which the worm is rotated.

If the engagement of balls 10 in the grooves of both the worm and the gear sector is to be maintained constant throughout each revolution of the worm, as described above, best advantage of such operation can be taken only if such engagement is extremely accurate. As previously pointed out, this is particularly desirable in the case of an automotive steering gear, where all play in the parts should be avoided. The worm 1 is held fixed between tapered antifriction bearings 11 and 12 which face in opposite directions. One of these bearings, such as 12, is seated in a shouldered cavity in the casing 21, while the other bearing 11 is held in place by a cover 13 bolted to the casing. The shaft 14 carrying the worm 1 extends through a bore 15 in the casing, so that its outer end is accessible for rotating the worm. This shaft may constitute the steering column of an automotive vehicle.

The worm gear sector 2 is mounted on a shaft 22, which may be supported by spaced antifriction bearings 23 of the needle bearing type. The outer end 24 of this shaft may be splined and threaded for attachment to a steering arm. A cover 25 bolted to the casing 21 is removable for access to the worm gear sector.

The worm bearings 11 and 12 will be located so that the central plane through the worm 1, perpendicular to shaft 14, coincides with the axis of the gear sector shaft 22. A small variation in the location of such plane axially of the worm from its center is not serious. The bearing 23 should, however, be located so that the axes of shaft 22 and worm 1 are spaced apart exactly the correct distance to enable the balls 10 to bear properly against both the worm and worm gear sector without appreciable backlash. Ordinarily to establish this relationship, even initially, it is necessary to machine the parts with great care, and if the parts wear this relationship is not preserved. Consequently it is desirable to mount the worm and gear sector for adjustment of the distance between their axes.

Bearings 23 may be received in a sleeve 26 fitting closely in a bore in casing 21 and rotatable relative to it. If these bearings are located slightly eccentrically of the axis of the cylindrical exterior of this sleeve, the axis of shaft 22 may be moved slightly toward or away from the axis of worm 1 by rotating sleeve 26 within the casing. The spacing between the axes of the sleeve's inner and outer peripheries may be of the order of one sixty-fourth of an inch. The desired spacing between the axes of the worm 1 and gear 2 may therefore be established, either initially or after the grooves in the worm and worm gear sector have become somewhat worn, merely by setting such sleeve in the corresponding rotative position. The sleeve may then be held in such setting by a set screw 27 threaded in the wall of casing 21 and having an inner tip adapted to press against the sleeve or to fit in any one of a number of holes disposed circumferentially around it. Such holes 28 are shown in Figure 4, disclosing a structure slightly different from that of Fig. 2.

Figure 3:
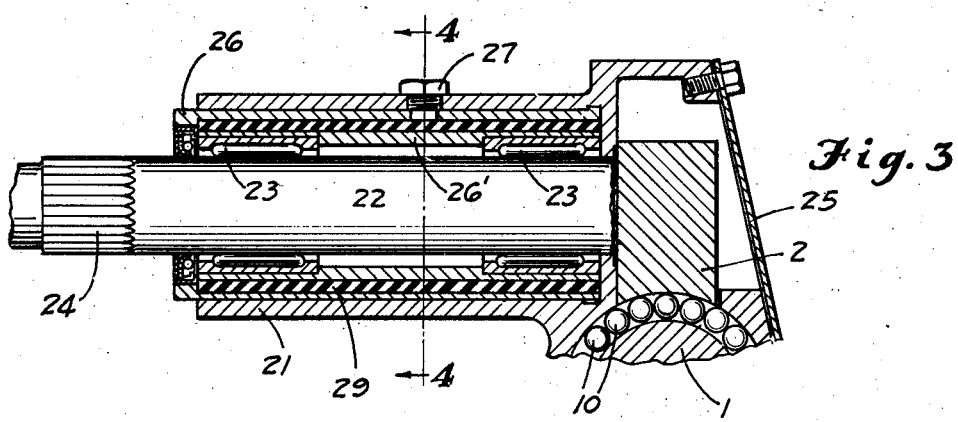
Figure 3 is a transverse sectional view through worm and worm gear sector mechanism similar to Figure 2, but showing parts broken away and illustrating a modified form of mounting.
Figures 4, 5:
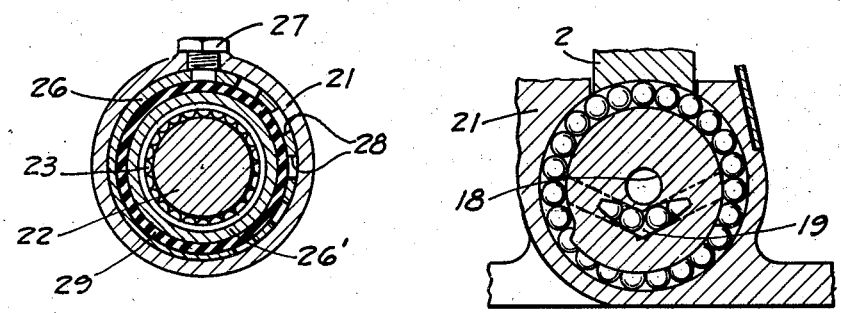
Figure 4 is a sectional view through the same device taken on line 4—4 of Figure 3.
Figure 5 is a fragmentary sectional view through a worm of the type shown in Figures 1, 2 and 3, provided with a different type of by-pass passage through the worm.

The modification of Figures 3 and 4 also incorporates a sleeve 26 having a slightly eccentric bore, and which fits closely within casing 21. In this instance, however, the bearings 23 do not seat directly upon the inner periphery of the sleeve 26. On the contrary, a resilient bushing 29 of rubber, or preferably of similar synthetic material, is interposed between the sleeve 26 and an inner tube 26' which retains the bearings. The rubber bushing should be suitably bonded to both of these parts so that the composite resilient unit can be rotated to adjust the position of the gear sector shaft axis toward or away from the axis of worm 1.

Since sleeve 26 is of varying wall thickness the axis of gear shaft 22 will be closest to the axis of worm 1 when the thickest part of the sleeve is located farthest from the worm and immediately beneath locking screw 27, as shown in Figure 4. If the balls 10 are engaged fairly tightly between the worm and the worm gear sector when the parts are in the relative positions of Fig. 1, rotation of sleeve 26 to locate a thicker wall portion beneath the locking screw would compress the side of resilient bushing 29 remote from the worm radially between sleeve 26 and tube 26'. The balls 10 would then be clamped between the worm and worm sector under resilient pressure, which may be varied in degree by proper rotative adjustment of sleeve 26.

Where a two-part sleeve for carrying bearings 23 is used, as shown in Fig. 3, sleeve 26 may be turned sufficiently so that, when a gear sector groove is located centrally of the worm, the bushing 29 will be compressed to a substantial degree. All backlash between the worm and the worm gear sector will be eliminated by this expedient when the parts are in the relationship of Figure 1, yet the friction of the mechanism will not be increased appreciably because, as mentioned previously, the use of alternate large and small balls eliminates all sliding friction between adjacent balls, provided that they all rotate at the same peripheral speed.

As worm 1 is now turned the pressure of the compressed bushing 29 will continually urge worm gear shaft 22 toward the worm axis to prevent backlash in all rotative positions of the worm. Moreover, when the spacing between the bottoms of the worm gear groove engaged by the balls and of the worm groove is kept constant by use of the structure described above, the resilient pressure of the worm and worm gear sector against the balls will remain constant. If the worm is of conventional cylindrical type, however, such pressure will vary somewhat as bushing 29 expands to move gear shaft 22 toward the worm to compensate for the tendency of the spacing between the bottoms of the gear's ball engaging groove and of the cooperating portion of the worm groove to increase.

To permit such movement of the gear sector the sum of the lengths of the maximum worm and gear radii must be less than the perpendicular distance between their axes, so that the point of the gear periphery closest to the worm will not come into engagement with it. Even though the worm is of the cylindrical type, therefore, having a constant root diameter, and although the pressure on the bearing balls 10 may vary, the resilient worm gear mounting can cause the worm and gear to exert sufficient pressure upon such balls in all rotative positions of the worm to prevent appreciable backlash between the parts. The variation in pressure on the balls in such an assembly will not vary too greatly because the maximum variation in the distance between the bottom of a groove of a fixed gear sector and the axis of the worm during rotation of the worm through 180 degrees would be only about 1/64 of an inch in a typical instance. The variation is nevertheless sufficiently large to permit undesirable backlash if no compensation is provided.

Since it is desirable to lubricate needle bearings 23, as well as the worm and gear, for example through lubrication fittings 3 of conventional type shown in Fig. 1, it is preferred that the resilient bushing 29 be of material not deteriorated by petroleum products. Reference to such bushing as of rubber, therefore, is intended to include synthetic rubbers such as Neoprene and other resilient lubricant resistant substances suitable for the purpose described.

As in the worm and gear mechanism shown in my previous application Serial No. 517,927, the balls circulate through a by-pass aperture 16 in the worm body extending between the ends of the effective portion of the worm groove, which is preferably about one and one-half turns. The balls are guided for movement through passage 16 by suitable deflectors shown in Figure 1. Also the balls may be held more closely in the groove to prevent variation in clearance between the balls by forming the casing of a contour complemental to the variation in groove depth. Thus the casing may have a hump or ridge located centrally of the worm, as shown exaggerated in size in Fig. 1. Since the difference in spacing between the worm's axis and the bottoms of extreme portions of the groove is so slight, however, this expedient may not be necessary.

Where antifriction mechanism of the type described is incorporated in an automotive steering gear it is usually desirable for the steering column 14 to be tubular so that electrical wires may pass through its hollow interior 17. In such event an aperture 18, as shown in Fig. 5, may extend axially through the worm 1. Such an aperture would conflict with a ball by-pass passage such as 16 in Fig. 2, which is disposed in a diametral plane of the worm. The balls may, however, pass between the same portions of the worm groove through the passage 19 of Fig. 5, composed of end portions meeting at an angle. Alternatively a linear by-pass passage may be located in a chordal plane at one side or the other of the axial aperture 18, instead of in a diametral plane as shown in Fig. 2.

I claim as my invention:

1. Antifriction worm and gear mechanism, comprising a gear having an inclined groove therein, a worm adjacent to said gear and having only a single helical groove therein complemental to the inclined groove of said gear, the spacing of the bottom of the worm groove from the worm axis being minimum substantially in an axial plane of said gear disposed perpendicular to the axis of said worm, and such spacing between the worm groove bottom and the worm axis increasing progressively away from such plane throughout a distance to each side of such plane not appreciably exceeding one-half a turn of the worm groove, and balls engaged closely by the grooves of said gear and worm.

2. Antifriction worm and gear mechanism, comprising a gear having an inclined groove therein, a worm adjacent to said gear and having only a single helical groove therein complemental to the inclined groove of said gear, the spacing of the bottom of the worm groove from the worm axis being minimum substantially in an axial plane of said gear disposed perpendicular to the axis of said worm, and such spacing between the worm groove bottom and the worm axis increasing progressively, substantially in proportion to the root radius of said gear minus the cosine of the gear angle multiplied by the gear's root radius, away from such plane throughout a distance to each side of such plane not appreciably exceeding one-half a turn of the worm groove, and balls engaged closely by the grooves of said gear and worm.

3. Antifriction worm and gear mechanism, comprising a gear having an inclined groove therein, a worm adjacent to said gear and having only a single helical groove therein complemental to the inclined groove of said gear, the spacing of the bottom of the worm groove from the worm axis being minimum substantially in an axial plane of said gear disposed perpendicular to the axis of said worm, and such spacing between the worm groove bottom and the worm axis increasing progressively away from such plane substantially in proportion to the square of the worm angle throughout a distance to each side of such plane not appreciably exceeding one-half a turn of the worm groove, and balls engaged closely by the grooves of said gear and worm.

4. Antifriction worm and gear mechanism, comprising a gear having an inclined groove therein, a worm adjacent to said gear and having only a single helical groove therein complemental to the inclined groove of said gear, the spacing of the bottom of the worm groove from the worm axis being minimum substantially in an axial plane of said gear disposed perpendicular to the axis of said worm, and such spacing between the worm groove bottom and the worm axis increasing progressively away from such plane throughout a distance to each side of such plane not appreciably exceeding one-half a turn of the worm groove, and balls engaged closely by the grooves of said gear and worm, the spacing between the worm groove bottom and the worm axis decreasing progressively immediately beyond each such half turn of the worm to release the balls abruptly from close engagement with said gear and worm grooves.

5. Antifriction worm and gear mechanism comprising a gear having an inclined groove therein, a worm adjacent to said gear and having a helical groove therein complemental to the inclined groove of said gear, the worm groove as developed on a plane being concave axially of said worm throughout approximately one complete turn, and a portion of the developed worm groove joining an end of said concave portion in a crest, and balls engaged closely by the groove of said gear and by such concave portion of the worm groove as developed.

6. Antifriction worm and gear mechanism comprising a gear having an inclined groove therein, a worm adjacent to said gear and having a helical groove therein complemental to the inclined groove of said gear, the worm groove as developed on a plane being concave axially of said worm throughout approximately one complete turn, and a portion of the developed worm groove adjoining an end of said concave portion being similarly concave and joining such first cncave portion in a crest, and balls engaged closely by the groove of said gear and such first concave portion of the worm groove as developed.

7. Antifriction worm and gear mechanism, comprising a gear having an inclined groove therein, a worm adjacent to said gear and having only a single helical groove therein complemental to the inclined groove of said gear, the bottom of the worm groove as developed on a plane being of substantially parabolically concave contour axially of said worm throughout a distance not appreciably exceeding a complete turn, and balls engaged closely by the groove of said gear and the parabolic portion of the worm groove as developed.

8. Antifriction worm and gear mechanism, comprising a gear having an inclined groove therein, a worm adjacent to said gear and having a helical groove therein complemental to the inclined groove of said gear, the bottom of the worm groove as developed on a plane being of substantially parabolically concave contour axially of said worm throughout approximately a complete turn, a portion of the developed worm groove adjoining an end of such parabolic portion departing substantially from a continuation of such parabolically concave contour, and balls engaged closely by the groove of said gear and the parabolic portion of the worm groove as developed.

9. Antifriction worm and gear mechanism, comprising a gear having an inclined groove therein, a worm adjacent said gear and having a helical groove therein complemental to the inclined groove of said gear, the bottom of the worm groove as developed on a plane being of substantially parabolically concave contour axially of said worm throughout approximately a complete turn, a portion of the developed worm groove adjoining an end of such parabolic portion being of reverse curvature, and balls engaged closely by the groove of said gear and the parabolic portion of the worm groove as developed.

10. Antifriction worm and gear mechanism comprising a gear having an inclined groove therein, a worm adjacent to said gear and having a helical groove therein complemental to the inclined groove of said gear, balls engaged between the groove of said gear and the worm groove, and means supporting said worm and gear and resiliently urging them relatively toward each other to clamp said balls under resilient pressure between such gear and worm grooves in all rotative positions of the worm and gear.

11. Antifriction worm and gear mechanism comprising a gear having an inclined groove therein, a worm adjacent to said gear and having a helical groove therein complemental to the inclined groove of said gear, balls engaged between the groove of said gear and the worm groove, two shafts, one supporting said worm and the other supporting said gear, adjusting means including a sleeve of varying wall thickness encircling one of said shafts and circumferentially adjustable to vary the position of such shaft toward or away from the other shaft, to adjust the engagement of said balls by such gear and worm grooves in all rotative positions of the worm and gear, a tube interposed between said sleeve and the shaft encircled thereby, and a resilient bushing interposed between said tube and said sleeve, adapted to be deformed by circumferential adjustment of said sleeve tending to effect approach movement of said shafts, and thereby resiliently urging them relatively toward each other to clamp said balls under resilient pressure.

12. Antifriction worm and gear mechanism, comprising a gear having an inclined groove therein, a worm adjacent to said gear and having only a single helical groove therein complemental to the inclined groove of said gear, balls engaged between the groove of said gear and the worm groove, and means supporting said worm and gear and urging them relatively toward each other to clamp said balls under resilient pressure between such gear and worm grooves, the spacing of the bottom of the worm groove from the worm axis being minimum substantially in an axial plane of said gear disposed perpendicularly relative to the axis of said worm, and said spacing between the worm groove bottom and the worm axis increasing progressively away from such plane throughout a distance to each side of such plane not appreciably exceeding one-half a turn of the worm groove, and sufficiently to maintain the spacing between the bottom of the gear groove and the bottom of the worm groove substantially constant throughout a complete turn of the worm, thereby to maintain substantially constant the resilient pressure of said supporting means on said balls in all rotative positions of the worm and gear.

13. Antifriction worm and gear mechanism, comprising a gear having an inclined groove therein, a worm adjacent to said gear and having only a single helical groove therein complemental to the inclined groove of said gear, balls engaged between the groove of said gear and the worm groove, two shafts, one supporting said worm and the other supporting said gear, and adjusting means including a sleeve of varying wall thickness encircling said gear supporting shaft and circumferentially adjustable to vary the position of such shaft toward or away from said worm supporting shaft, to adjust the engagement of said balls by said gear and worm grooves, the spacing of the bottom of the worm groove from the worm axis being minimum substantially in an axial plane of said gear disposed perpendicularly relative to the axis of said worm, and said spacing between the worm groove bottom and the worm axis increasing progressively away from such plane throughout a distance to each side of such plane not appreciably exceeding one-half a turn of the worm groove, and sufficiently to maintain the spacing between the bottom of the gear groove and the bottom of the worm groove substantially constant throughout a complete turn of the worm, thereby to maintain substantially constant the adjusted engagement of said gear and worm grooves on said balls in all rotative positions of the worm and gear.

14. Antifriction worm and gear mechanism, comprising a gear having an inclined groove therein, a worm adjacent to said gear and having only a single helical groove therein complemental to the inclined groove of said gear, balls engaged between the groove of said gear and the worm groove, two shafts, one supporting said worm and the other supporting said gear, adjusting means including a sleeve of varying wall thickness encircling said gear supporting shaft and circumferentially adjustable to vary the position of such shaft toward or away from said worm supporting shaft, a tube interposed between said sleeve and said gear shaft, and a resilient bushing interposed between said sleeve and said tube, and compressible by circumferential adjustment of said sleeve to press said gear resiliently against said balls, the worm groove developed on a plane being concave axially of said worm throughout approximately one complete turn to maintain the spacing between the bottoms of the gear groove and of such portion of the worm groove substantially constant, so that the resilient pressure of said gear on the balls effected by said bushing remains substantially constant in all rotative positions of the worm and gear.

15. Antifriction worm and gear mechanism, comprising a gear having an inclined groove therein, a worm adjacent to said gear and having a helical groove therein complemental to the inclined groove of said gear, the worm groove as developed on a plane being concave axially of said worm throughout its central portion, and a portion of the worm groove, in its developed form, joining an end of said concave portion to form therewith substantially a ceratoid cusp, and balls engaged closely by the groove of said gear and by such portion of the worm groove concave in its developed form.

16. Antifriction worm and gear mechanism, comprising a gear having an inclined groove therein, a worm adjacent to said gear and having a helical groove therein complemental to the inclined groove of said gear, balls engaged between the groove of said gear and the worm groove, two shafts one supporting said worm and the other supporting said gear, a sleeve encircling one of said shafts, a tube interposed between said sleeve and the shaft encircled thereby, bearing means interposed between said tube and said shaft, and a resilient bushing interposed between said tube and said sleeve adapted to be stressed to urge said tube therewithin in a direction to press said gear and worm resiliently toward each other to clamp said balls under resilient pressure.

HENRY S. HOFFAR.